US010758922B2

(12) United States Patent
MacIndoe (10) Patent No.: US 10,758,922 B2
(45) Date of Patent: Sep. 1, 2020

(54) FLUID DISPENSING APPARATUS AND METHODS UTILIZING A RESILIENT NOZZLE

(71) Applicant: NORDSON CORPORATION, Westlake, OH (US)

(72) Inventor: William MacIndoe, Exeter, RI (US)

(73) Assignee: Nordson Corporation, Westlake, OH (US)

( * ) Notice: Subject to any disclaimer, the term of this patent is extended or adjusted under 35 U.S.C. 154(b) by 57 days.

(21) Appl. No.: 16/251,001

(22) Filed: Jan. 17, 2019

(65) Prior Publication Data

US 2019/0151869 A1 May 23, 2019

Related U.S. Application Data

(62) Division of application No. 14/706,236, filed on May 7, 2015, now Pat. No. 10,213,795.

(51) Int. Cl.
*B05B 1/32* (2006.01)
*B05B 1/30* (2006.01)
*F16K 1/14* (2006.01)
*B05C 5/02* (2006.01)
*F16K 31/122* (2006.01)

(52) U.S. Cl.
CPC ............. *B05B 1/32* (2013.01); *B05B 1/3046* (2013.01); *F16K 1/14* (2013.01); *F16K 31/1221* (2013.01); *B05B 1/306* (2013.01); *B05C 5/0225* (2013.01)

(58) Field of Classification Search
CPC ....... B05B 1/302; B05B 1/3046; B05B 1/306; B05B 1/32; F16K 1/14; B05C 5/0225; B05C 5/0237
See application file for complete search history.

(56) References Cited

U.S. PATENT DOCUMENTS

| | | |
|---|---|---|
| 3,127,905 A | 4/1964 | Vogeli |
| 4,376,447 A | 3/1983 | Chumley |
| 4,445,532 A | 5/1984 | Mitchell |
| 5,113,898 A | 5/1992 | White et al. |
| 5,249,600 A | 10/1993 | Blume |
| 5,747,102 A | 5/1998 | Smith et al. |
| 5,887,768 A | 3/1999 | Price et al. |
| 6,253,957 B1 | 7/2001 | Messerly et al. |
| 6,267,266 B1 | 7/2001 | Smith et al. |
| 6,435,475 B1 | 8/2002 | Blume |
| 8,312,805 B1 | 11/2012 | Blume |
| 2002/0195505 A1 | 12/2002 | Haruch et al. |

(Continued)

*Primary Examiner* — Darren W Gorman
(74) *Attorney, Agent, or Firm* — Baker & Hostetler LLP (57) ABSTRACT

A fluid dispensing apparatus includes a dispenser body, a valve stem with a valve tip, and a nozzle having a nozzle body defining a fluid chamber terminating in a discharge outlet, an annular valve seat, and a resilient annular portion. A method for dispensing droplets of fluid with the fluid dispensing apparatus includes moving the valve stem relative to the dispenser body and the nozzle body, collecting fluid in the fluid chamber flowing from the dispenser body when the valve stem is moved in an upstream direction with the valve tip out of engagement with the annular valve seat and the resilient annular portion, and dispensing fluid in the fluid chamber out of the discharge outlet when the valve stem is moved in a downstream direction.

15 Claims, 9 Drawing Sheets

(56) References Cited

U.S. PATENT DOCUMENTS

| | | | |
|---|---|---|---|
| 2010/0294810 A1* | 11/2010 | Ikushima | B05C 11/1034 |
| | | | 222/309 |
| 2011/0036432 A1 | 2/2011 | Ouriev | |
| 2012/0286072 A1* | 11/2012 | Saidman | B05C 5/0225 |
| | | | 239/533.1 |
| 2012/0312838 A1* | 12/2012 | Clark | B05C 5/0225 |
| | | | 222/146.5 |
| 2013/0105597 A1 | 5/2013 | Dunlap et al. | |
| 2013/0306176 A1 | 11/2013 | Harada et al. | |
| 2015/0115000 A1* | 4/2015 | Riney | B05C 5/0225 |
| | | | 222/559 |

* cited by examiner

FLUID DISPENSING APPARATUS AND METHODS UTILIZING A RESILIENT NOZZLE

TECHNICAL FIELD

This application is a divisional of U.S. patent application Ser. No. 14/706,236, filed May 7, 2015, and published as U.S. Patent App. Pub. No. 2016/0325294 on Nov. 10, 2016, the disclosure of which is hereby incorporated by reference herein.

TECHNICAL FIELD

The present invention generally relates to a fluid dispensing apparatus and, more particularly, to a fluid dispensing apparatus having a moveable stem.

BACKGROUND

A fluid dispensing apparatus operates to dispense precise volumes of fluid onto a substrate or workpiece during a manufacturing process. The dispensed fluid may include viscous material such as solder flux, solder paste, adhesives such as hot melt adhesive, solder mask, thermal compounds, oil, encapsulants, potting compounds, inks, and silicones. Conventionally, these fluid dispensing apparatus include a moveable valve member that rapidly moves in a reciprocating manner towards and away from contact with a valve seat located in a nozzle. The nozzle is typically formed from a non-resilient material such as a metal, and the nozzle includes a passageway in communication with an outlet of the fluid dispensing apparatus. During the rapid movement towards the valve seat, the moveable valve member forces the precise volume of fluid into the passageway and thereafter through the outlet onto the substrate or workpiece thereby "jetting" the precise volume out of the fluid dispensing apparatus.

Some conventional fluid dispensing apparatus of this type have certain drawbacks. For example, when a volume of the fluid breaks off from the outlet onto the substrate or workpiece, some fluid may remain on or around the outlet, which can harden over time and thereby impede or affect the accurate dispensing of further fluid volumes from the fluid dispensing apparatus. Moreover, upon contacting the valve seat in a non-resilient nozzle, the moveable valve member typically experiences a recoil movement by which temporarily recoils or "bounces" away from the valve seat before returning to contact with the valve seat. This recoil movement may force undesired small amounts of additional fluid towards the outlet and, as a result, to the substrate or workpiece. Such additional fluid may also remain on or around the outlet and harden over time as set forth above. In addition, when the moveable valve member approaches contact with the valve seat in these conventional designs, some fluid is forced back into the dispensing apparatus and some fluid is forced to move towards and through the discharge outlet. This split of the fluid in these two directions can vary slightly for each dispensing cycle, which means it is difficult to dispense a truly fixed and repeatable volume in each dispensing cycle, even with careful control of the actuation of the moveable valve member.

Therefore, it is desirable to provide a fluid dispensing apparatus that overcomes these and other deficiencies of conventional fluid dispensing apparatus, as described herein.

SUMMARY

In one embodiment, a nozzle is configured for use with a fluid dispensing apparatus configured to dispense fluid, the fluid dispensing apparatus including a valve stem that has a valve tip and is movable in upstream and downstream directions. The nozzle includes a nozzle body with a fluid chamber terminating in a discharge outlet configured to discharge fluid from the fluid chamber when the valve stem moves in the downstream direction. The nozzle also includes an annular valve seat located at the nozzle body upstream from the discharge outlet and configured to contact the valve tip as the valve stem moves in the downstream direction. To this end, the valve seat is "located at" the nozzle body by either being integrally formed with the remainder of the nozzle body or by being coupled as a separate element to the nozzle body. The nozzle further includes a resilient annular portion that extends from the nozzle body in the upstream direction so as to define a portion of the fluid chamber, the resilient annular portion being adjacent to the annular valve seat. As the valve stem moves in the downstream direction, the resilient annular portion deflects radially outwards and forms a sealing engagement with the valve tip before the valve tip contacts the valve seat.

In one aspect, the resilient annular portion is configured to bias the valve tip in the upstream direction when the valve tip contacts the annular valve seat. Additionally or alternatively, the valve tip may include an outer spherical surface, and the resilient annular portion and the annular valve seat may be configured to contact the outer spherical surface as the valve stem moves in the downstream direction. Moreover, the annular valve seat may be circular and include a first diameter, the resilient annular portion may be circular and include a second diameter that is greater than the first diameter, and the outer spherical surface may include a third diameter that is greater than the second diameter.

In yet another aspect, the nozzle body includes an upstream surface. A central bore extends through the upstream surface of the nozzle body and defines a base surface. The resilient annular portion protrudes from the base surface in a direction towards the upstream surface. The fluid chamber communicates with the central bore when the valve tip is not in the sealing engagement with the resilient annular portion.

In a further aspect, the fluid chamber may include a conical outlet portion that extends from the annular valve seat to the discharge outlet. Moreover, the resilient annular portion may include an inner surface, and the fluid chamber may include a cylindrical portion adjacent to the conical portion, the cylindrical portion being defined by the inner surface of the resilient annular portion. It will be understood that the outlet portion may be re-shaped to be cylindrical in other embodiments.

In another embodiment, a fluid dispensing apparatus is configured to dispense fluid and includes a dispenser body, a valve stem operatively coupled to the dispenser body, and a nozzle operatively coupled to dispenser body. The valve stem includes a valve tip and is moveable in upstream and downstream directions. The nozzle is the same as described above, with a resilient annular portion positioned to deflect radially outwards and form a sealing engagement with the valve tip before the valve tip contacts the valve seat during downstream direction movement of the valve stem and valve tip.

In one further embodiment, a method for dispensing fluid with a fluid dispenser includes moving a valve stem in upstream and downstream directions relative to a dispenser body and a nozzle body. The method further includes collecting fluid in a fluid chamber flowing from the dispenser body when the valve stem is moved in an upstream direction such that the valve tip is out of engagement with an annular valve seat and a resilient annular portion at the nozzle body. Fluid is dispensed from the fluid chamber out of a discharge outlet when the valve stem is moved in the downstream direction. More specifically, as the valve stem moves in the downstream direction, a sealing engagement is formed between the resilient annular portion and the valve tip of the valve stem; the valve tip deflects the resilient annular portion outwards; the valve tip contacts the annular valve seat after forming the sealing engagement with the resilient annular portion, and the valve tip forces the fluid in the fluid chamber out of the nozzle via the discharge outlet. Additionally, after the valve tip contacts the annular valve seat, the resilient annular portion may bias the valve tip away from the annular valve seat.

Various additional features and advantages of the invention will become more apparent to those of ordinary skill in the art upon review of the following detailed description of the illustrative embodiments taken in conjunction with the accompanying drawings.

DETAILED DESCRIPTION

Figure 1:
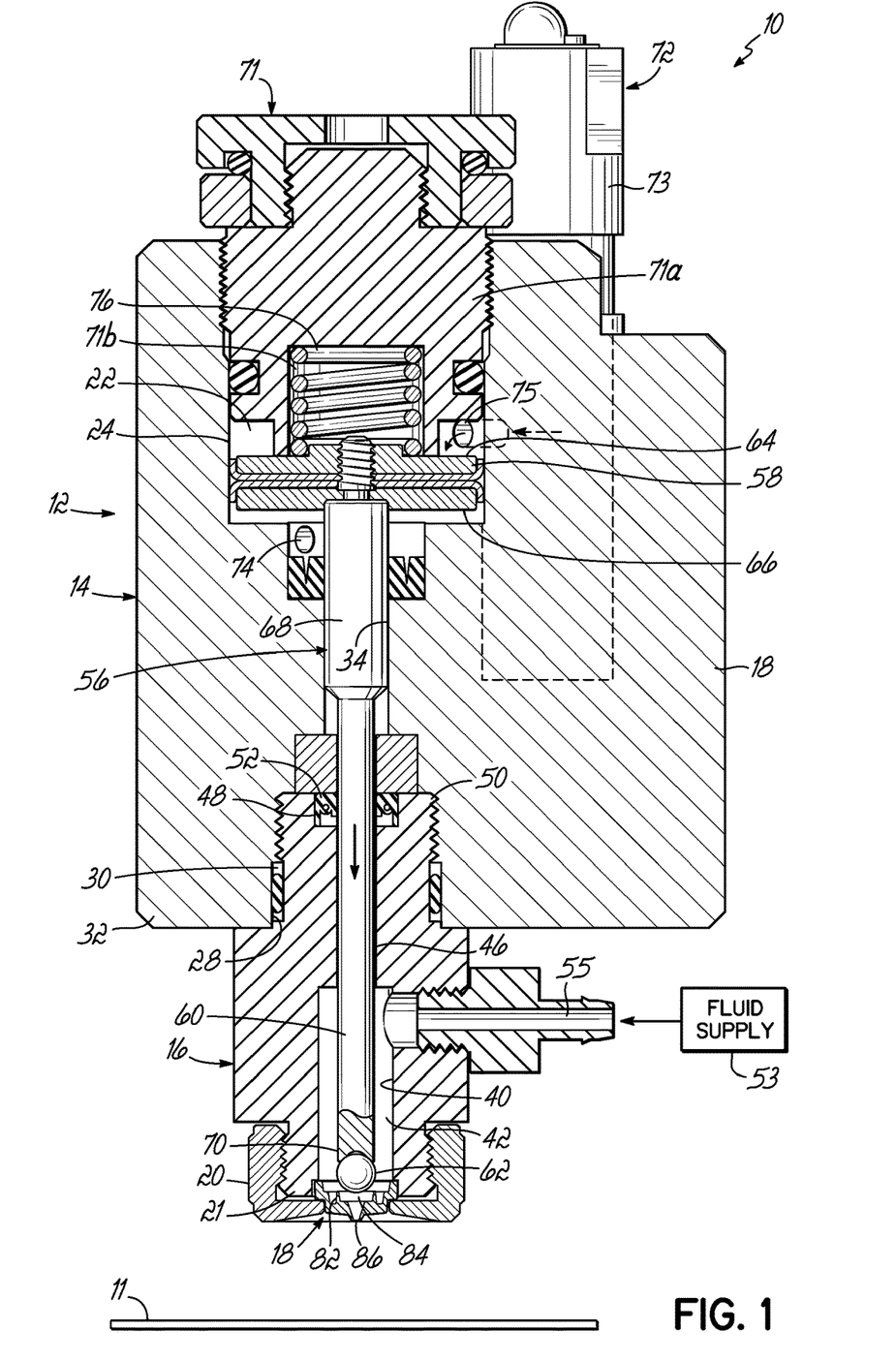
FIG. 1 is a cross-sectional view taken generally through a center of a fluid dispensing apparatus, the view showing a valve stem in an open position relative to a valve seat defined in a nozzle.

FIG. 1 illustrates an exemplary fluid dispensing apparatus 10 configured to dispense fluid, such as with a rapid jetting action, onto a substrate 11. The fluid dispensing apparatus 10 includes a dispenser body 12, which includes an actuator body 14 and a fluid body 16. The fluid dispensing apparatus 10 further includes a nozzle 18 through which the fluid is dispensed onto the substrate 11. The nozzle 18 is operatively coupled to the dispenser body 12. As illustrated, a collar 20 (also referred to as a nozzle cap) threadably engages a base portion 21 of the fluid body 16 to removably couple the nozzle 18 to the fluid body 16.

The actuator body 14 includes an actuator body bore 22 that generally extends along an axial direction of the actuator body 14 and is defined by an inner wall 24 in the actuator body 14. The actuator body 14 further includes a socket 30 generally extending along an axial direction of the actuator body 14 and located on an opposite end of the actuator body 14 from the actuator body bore 22. More particularly, the socket 30 is defined by an inner wall 28 and is located in a base portion 32 of the actuator body 14. A passageway 34 connects the actuator body bore 22 and the socket 30. As illustrated, the actuator body bore 22, the passageway 34, and the socket 30 are generally co-axial and collectively extend through the entire length of the actuator body 14. In this configuration, the fluid body 16 is partially received within the socket 30 of the actuator body 14.

The fluid body 16 includes an inner wall 40 that defines a fluid body bore 42. The inner wall 40 generally extends along an axial direction of the fluid body 16. The fluid body 16 further includes a passageway 46 that extends between the fluid body bore 42 and an opening 48 in an upper end portion 50 of the fluid body 16. The opening 48 may define a counterbore of a larger diameter than the passageway 46 so that a seal member 52 may be positioned within the opening 48. As illustrated, the fluid body bore 42 and the passageway 46 of the fluid body 16 are generally co-axial with the passageway 34 and the actuator body bore 22 of the actuator body 14.

The fluid body 16 is operatively connected with a fluid supply 53 such that the fluid body bore 42 is in fluid communication with the fluid supply 53 via an inlet passageway 55. In this way, the fluid supply 53 is able to supply fluid to the fluid body bore 42 to be dispensed through the nozzle 18. In one example, the fluid supply 53 is adapted to supply fluid to the fluid body bore 42 under pressure. The fluid supply 53 may include any one of a wide variety of fluids. For example, the fluid may include viscous material such as solder flux, solder paste, adhesives, solder mask, thermal compounds, oil, encapsulants, potting compounds, inks, silicones, and/or the like.

The fluid dispensing apparatus 10 further includes a valve member in the form of a plunger 56 adapted to force fluid in the fluid body bore 42 through the nozzle 18 and onto the substrate 11. As illustrated, the plunger 56 includes a piston assembly 58 coupled with a valve stem 60. The piston assembly 58 has a generally plate-like construction with opposing outer surfaces 64 and 66. The valve stem 60 extends along an axial direction between a proximal end 68 connected with the piston assembly 58 and a distal end 70, so as to extend generally perpendicular to the outer surfaces 64 and 66. The valve stem 60 further includes a valve tip 62 located at the distal end 70 of the valve stem 60 and positioned to interact with the nozzle 18 as set forth below.

The plunger 56 is operatively associated with the actuator body 14 and the fluid body 16 by extending through a substantial portion of the length of these elements. In particular, the piston assembly 58 is positioned in the actuator body bore 22 of the actuator body 14. The valve stem 60 extends from the piston assembly 58, through the passageway 34 of the actuator body 14, past the seal member 52 in the opening 48, through the passageway 46 of the fluid body 16, and into the fluid body bore 42. Consequently, the distal end 70 and the valve tip 62 of the valve stem 60 are also positioned in the fluid body bore 42.

An actuator mechanism 72 facilitates axial reciprocating movement of the plunger 56. In particular, the actuator mechanism 72 causes movement of the piston assembly 58 in a proximal direction (i.e., away from the nozzle 18) and a distal direction (i.e., towards the nozzle 18) within the actuator body bore 22. The valve stem 60 is coupled for movement with the piston assembly 58 such that, as the actuator mechanism 72 moves the piston assembly 58 axially within the actuator body bore 22, the valve stem 60, and consequently the valve tip 62, move axially within the fluid body bore 42. Specifically, as the actuator mechanism 72 moves the piston assembly 58 in the proximal direction and the distal direction, the valve stem 60 and valve tip 62 move in an upstream direction (i.e., away from the nozzle 18) and a downstream direction (i.e., towards the nozzle 18), respectively.

The plunger 56 is configured such that, as the actuator mechanism 72 causes the valve stem 60 to move in the upstream direction and the downstream direction, the valve tip 62 separates from the nozzle 18 and contacts the nozzle 18, respectively. When the valve tip 62 contacts the nozzle 18, a sealing engagement is formed therebetween such that fluid in the fluid body bore 42 cannot thereafter flow into and collect in a fluid chamber 84 defined in the nozzle 18 and described in further detail below. Separation of the valve tip 62 from the nozzle 18 eliminates this sealing engagement, thereby enabling the fluid in the fluid body bore 42 to flow into and collect in the nozzle 18.

In the illustrated embodiment, the actuator mechanism 72 includes a pneumatic system 73 and a spring 76. The spring 76 engages the topmost of the outer surfaces 64 to bias the piston assembly 58 and the valve stem 60 in a distal or downstream direction. The pneumatic system 73 provides air pressure to move the plunger 56 in the proximal direction, such as by selectively introducing pressurized air through an opening 74 communicating with a lower side of the piston assembly 58. More specifically, the pneumatic system 73 is a solenoid valve which controls the supply of pressurized air into passages (not shown) leading to the opening 74. When the pressured air flows through the opening 74, the air applies force to the bottommost of the outer surfaces 66 to overcome the spring bias and move the piston assembly 58 upward in the proximal direction. This movement of the piston assembly 58 in the proximal direction causes the valve stem 60 and the valve tip 62 to also move in the upstream direction within the fluid body bore 42. Prior to such upstream movement, the valve tip 62 contacts the nozzle 18 to form the sealing engagement therewith, as described above.

As the piston assembly 58 moves in the proximal direction, it bears against and further compresses the spring 76, which is located at least partially in a stroke adjustment member 71a of a stroke adjustment assembly 71. As shown in FIG. 1, the spring 76 is located in an end bore 71b of the stroke adjustment member 71a, so as to be compressed between stroke adjustment assembly 71 and the piston assembly 58. The stroke adjustment assembly 71 is typically threadably coupled with the actuator body 14 so as to be adjustable in position, which thereby modifies the stroke length through which the piston assembly 58 and the valve stem 60 can move. After a fixed amount of time, which is adjustable by an operator via a valve controller (not shown), the pneumatic system 73 ceases to provide air pressure through the opening 74. This enables the spring 76 to once again move the piston assembly 58 in the distal direction as a result of the spring bias. It will be understood that the upper side of the piston assembly 58 may communicate with an opening 75 that vents to ambient atmosphere to allow free movement of the piston assembly 58 without needing to overcome air compression or vacuum forces within the piston chamber. Alternatively, the pneumatic system 73 may introduce pressurized air through the opening 75 above the piston assembly 58 and thereby assist the spring 76 in moving the piston assembly 58 in the distal direction. Either way, as the piston assembly 58 moves in the distal direction, the valve tip 62 moves in the downstream direction within the fluid body bore 42 and contacts a valve seat 80 located at the nozzle 18. Such contact helps force the fluid out of the nozzle 18 and onto the substrate 11.

In alternative embodiments, the actuator mechanism 72 may include a piezo-electric actuator, a solenoid actuator, a voice coil actuator, a mechanical motor actuator or any other type of actuator suitable for facilitating controlled, reciprocating movement of the plunger 56. The actuator mechanism 72 may further include the biasing spring 76 in combination with any of these alternative actuator types.

Figure 2:
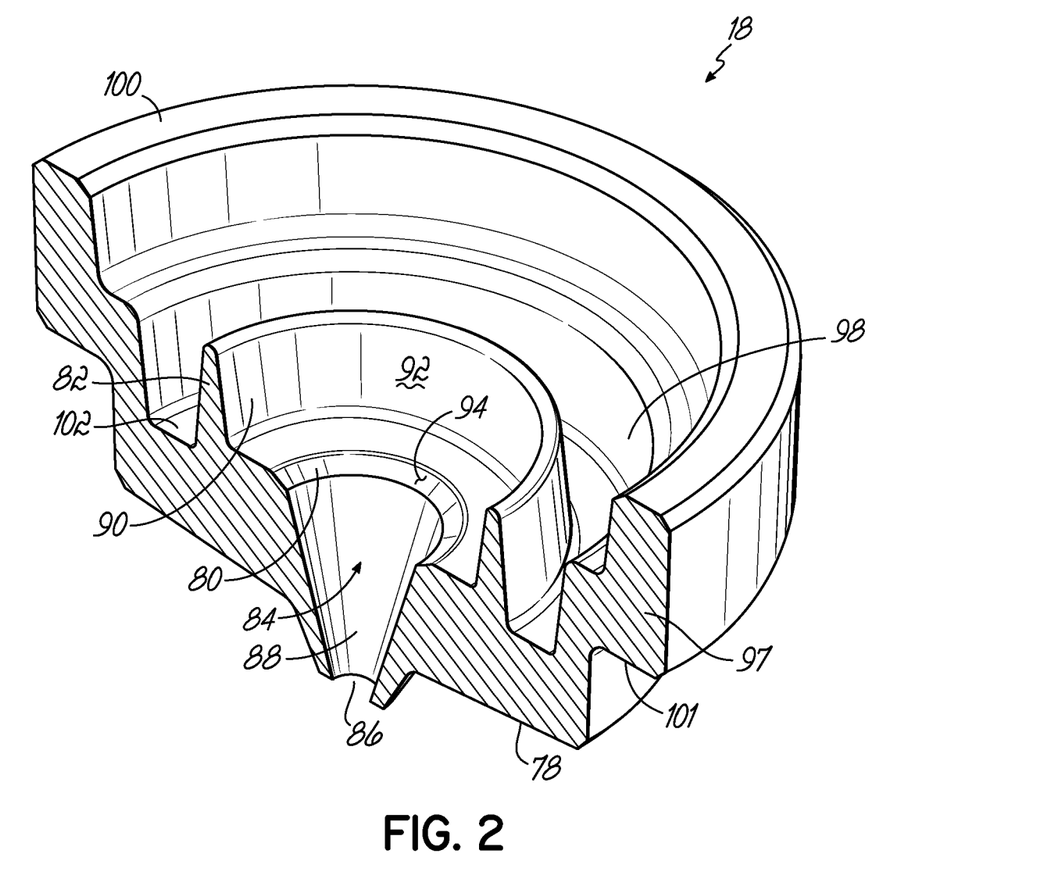
FIG. 2 is an isometric view partially in cross-section showing the nozzle of FIG. 1.

Referring now to FIG. 2, the nozzle 18 includes a nozzle body 78 having a generally annular shape surrounding a conical passageway 88 (also referred to as an "outlet passageway" or "outlet portion") which defines a passage through the nozzle 18. The nozzle body 78 of this embodiment defines an annular valve seat 80 and a discharge outlet 86 on opposite end of the conical passageway 88. It will be understood that the valve seat 80 may in alternative embodiments be provided in a separate element coupled to the nozzle body 78 in the location shown in FIG. 2 without departing from the scope of this disclosure. Furthermore, although the conical passageway 88 is shown with a narrowing or conical shape along its length in the illustrated embodiment, other types of passageways may also be provided to extend between the valve seat 80 and the discharge outlet 86 (e.g., cylindrical, a combination of conical and cylindrical, or other known shapes) without departing from the scope of the invention. The nozzle 18 further includes a resilient annular portion 82 that extends proximally/upwardly from the nozzle body 78 and is adjacent to the annular valve seat 80. As illustrated, the nozzle body 78, the annular valve seat 80, and the resilient annular portion 82 are formed as one integrated unit from a material having some resiliency, such as polyimide plastic for example. However, in alternative embodiments, one or more of these elements of the nozzle 18 may be manufactured separately and thereafter attached together. Furthermore, it will be appreciated from FIG. 2 that the resilient annular portion 82 is a separate element from the valve seat 80 and is spaced apart from the valve seat 80 in the illustrated embodiment, thereby to enable the valve tip 62 to contact these elements in sequence during movement of the valve tip 62 as described further below.

Figure 3A:
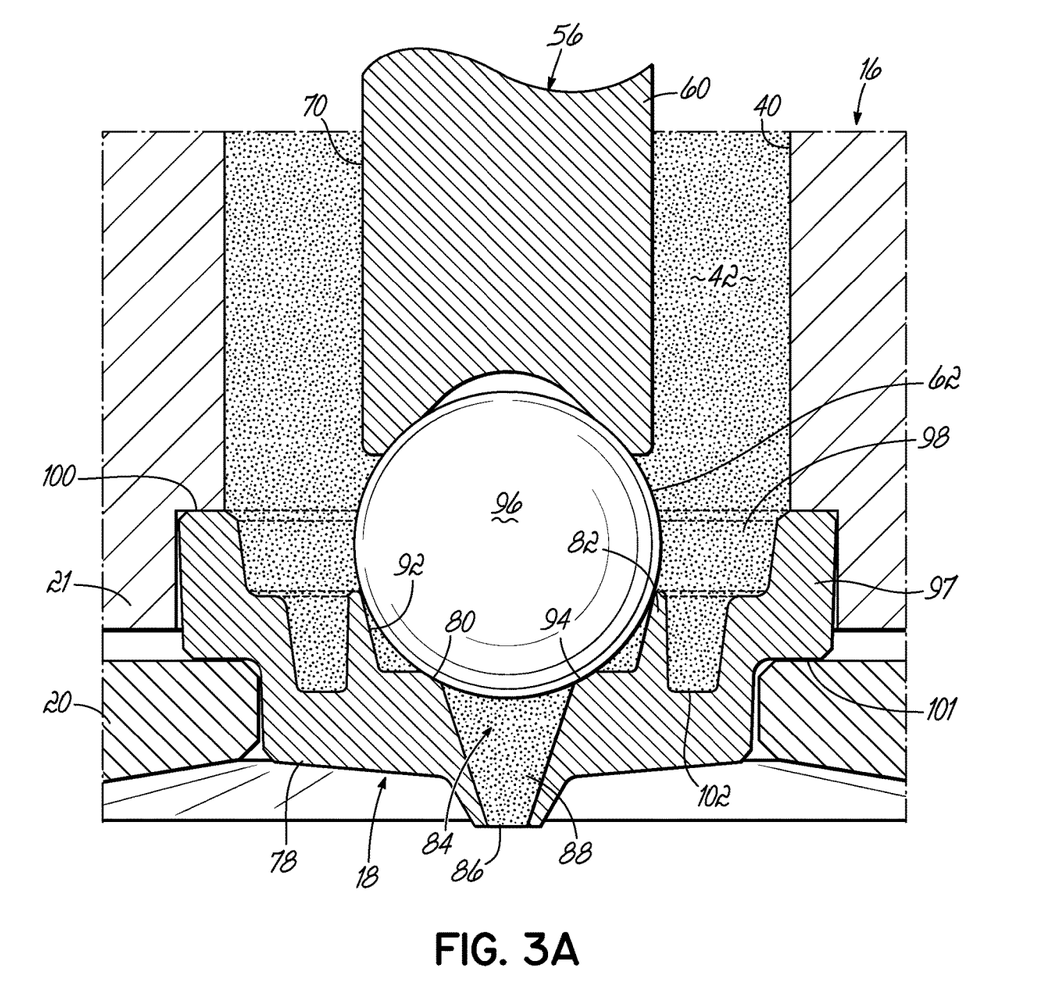
FIG. 3A is an enlarged cross-sectional view of the nozzle and valve stem of FIG. 1, shown in a rest position with fluid in the fluid dispensing apparatus.

In one embodiment, the nozzle 18 includes a positioning rim 97 that projects upwardly/proximally and outwardly in a stepped configuration from a base surface 102 on the nozzle body 78 (specifically from an outer periphery of the base surface 102). The positioning rim 97 thereby defines a central bore 98 that extends between an upstream surface 100 of the nozzle 18 and the base surface 102. The base surface 102 is adjacent to the annular valve seat 80. To this end, it may also be described that the valve seat 80 is formed in the base surface 102. The resilient annular portion 82 protrudes upwardly/proximally from the base surface 102 and extends axially within the central bore 98 in a direction towards the upstream surface 100. In this regard, the resilient annular portion is located between the valve seat 80 and the positioning rim 97. Furthermore, at the location where the positioning rim 97 is stepped radially outwardly from the remainder of the nozzle body 78, the positioning rim 97 includes a shoulder surface 101 located adjacent an outer periphery of the base surface 102 and facing opposite the upstream surface 100. As shown in FIGS. 1 and 3A, the shoulder surface 101 is configured to be engaged by the radially inward structure of the nozzle cap 20 such that the positioning rim 97 is sandwiched firmly between the nozzle cap 20 and the base portion 21 of fluid body 16, thereby holding the nozzle 18 in position using the upstream and shoulder surfaces 100, 101.

Operation of the fluid dispensing apparatus 10 and the nozzle 18 will now be described in more detail with reference to FIGS. 3A-F. In FIG. 3A, when the fluid dispenser is at rest, the valve stem 60 is positioned such that the valve tip 62 rests on the annular valve seat 80 and also forms a sealing engagement with the resilient annular portion 82. More particularly, when the fluid dispensing apparatus 10 is at rest, the actuator mechanism 72 applies a static force on the plunger 56 in the distal direction, such as with the spring 76 bearing against the piston assembly 58, that overcomes the flexing resiliency of the resilient annular portion 82. To this end, the plastic and/or resilient material defining the nozzle 18 is provided with a thin ring-like cross section at the resilient annular portion 82, so as to enable some radial inward/outward flexing relative to the remainder of nozzle body 78, this flexing or deflection maintaining a sealing engagement with the valve tip 62 after initial contact when the valve tip 62 moves downwardly. It will be appreciated that the deflection of the resilient annular portion 82 also generates a counter bias force on the valve tip 62 that is less than the bias force of spring 76 when the actuator mechanism 72 moves the valve tip 62 distally into contact with the valve seat 80, at least in this embodiment. As a result, the valve tip 62 extends through and forms a sealing engagement with the resilient annular portion 82, and the valve tip 62 rests on the annular valve seat 80 when in the rest position.

Although FIG. 3A shows some fluid in a fluid chamber 84 of the nozzle 18, it will be understood that when the fluid dispensing apparatus 10 is at rest, little or no fluid may be present in the nozzle 18. The sealing engagement formed between the valve tip 62 and resilient annular portion 82 prevents fluid in the fluid body bore 42 from moving into and collecting in the fluid chamber 84 of the nozzle 18 when the fluid dispensing apparatus 10 is at rest. In this way, the sealing engagement reduces the potential for fluid drying up and clogging the nozzle 18, or inadvertently dispensing (e.g. dripping or drooling out), when the fluid dispensing apparatus 10 is at rest.

Figure 3B:
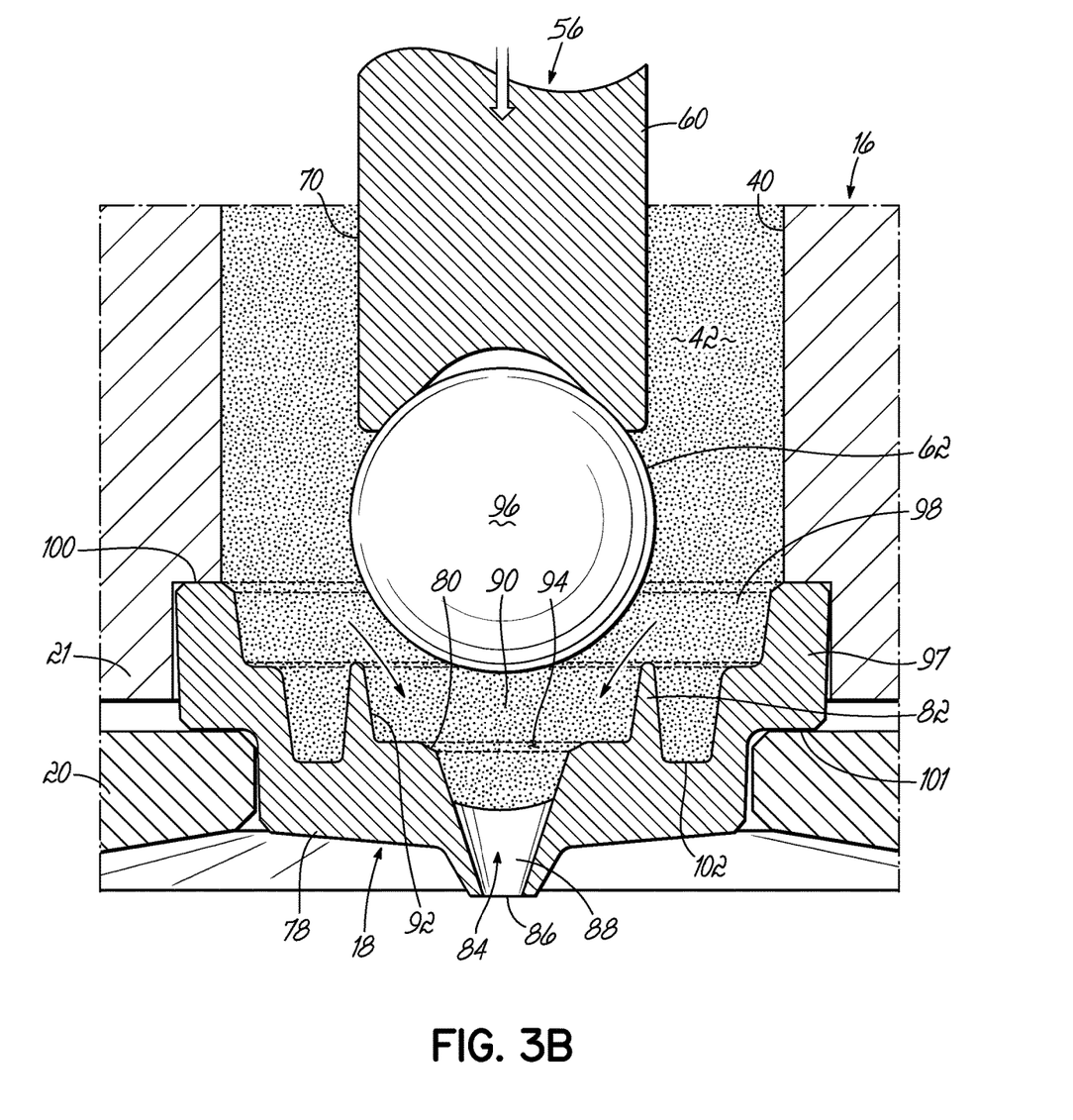
FIG. 3B is a further enlarged view of the nozzle and valve stem of FIG. 3A, with the valve stem in an open position.

Once the fluid dispensing apparatus 10 becomes operative to dispense fluid, the actuator mechanism 72 causes the valve stem 60 to move in the upstream direction as described above. Consequently, the valve tip 62 moves in the upstream direction and separates from the resilient annular portion 82 (FIG. 3B). As described above, this separation removes the sealing engagement between the resilient annular portion 82 and the valve tip 62, thereby enabling the pressurized fluid in the fluid body bore 42 to flow into and collect in the fluid chamber 84 of the nozzle 18 as indicated by the arrows in FIG. 3B.

In particular, when the valve tip 62 separates from the resilient annular portion 82, fluid in the fluid body bore 42 is able to collect in the fluid chamber 84, which is defined by the nozzle body 78, the annular valve seat 80, and the resilient annular portion 82 of the nozzle 18. The fluid chamber 84 is in fluid communication with the discharge outlet 86 through which the fluid is dispensed onto the substrate 11. Although not shown in these Figures, if the valve tip 62 is held in this open position of FIG. 3B for a sufficiently long period of time, the pressurized fluid moving into the fluid chamber 84 from the fluid body bore 42 may completely fill the fluid chamber 84 and begin to discharge from the discharge outlet 86 as a stream or bead of fluid. However, under normal operating circumstances, the valve tip 62 is separated from the resilient annular portion 82 only long enough to refill the fluid chamber 84 such that the closing of the valve tip 62 results in rapid jetting/dispensing of a fluid droplet from the dispensing apparatus 10.

In one embodiment, the fluid chamber 84 includes the conical passageway 88 (best illustrated in FIG. 2) that extends from the annular valve seat 80 to the discharge outlet 86. As described below, when the valve tip 62 moves in the downstream direction to force the fluid in the fluid chamber 84 towards the discharge outlet 86, the conical passageway 88 accelerates the fluid flow moving towards the discharge outlet 86. This acceleration helps facilitate a clean separation of the fluid deposit 89 (e.g., a jetted droplet of fluid in the illustrated embodiment) from the nozzle 18 once passed through the discharge outlet 86, thereby discouraging fluid from remaining on the nozzle 18 that may harden and/or clog the discharge outlet 86. As illustrated, the fluid chamber 84 also includes a generally cylindrical portion 90 (best illustrated in FIG. 2) that is adjacent to and upstream of the conical passageway 88. The generally cylindrical portion 90 is defined by an inner wall 92 of the resilient annular portion 82, the inner wall 92 extending between the base surface 102 and an upper terminal end of the resilient annular portion 82.

Figure 3C:
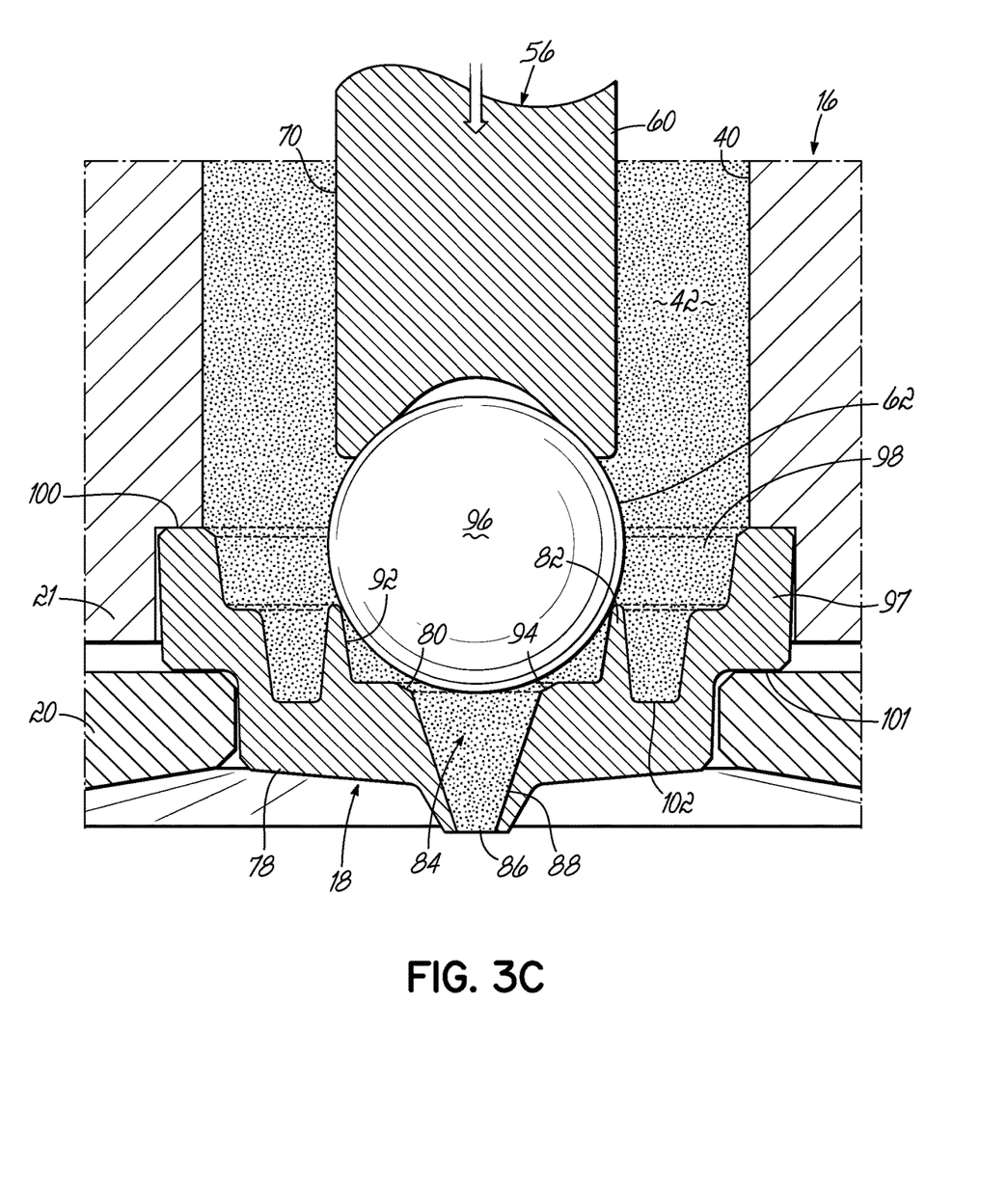
FIG. 3C is a similar view of to FIG. 3B and shows the valve stem moving in a downstream direction into initial engagement with a resilient annular portion projecting from the nozzle adjacent to the valve seat.

After a fixed period of time designed to allow a set desired amount of fluid flow into and through fluid chamber 84, which is adjustable by an operator, the actuator mechanism 72 causes the plunger 56 to move in the downstream direction. As the valve stem 60 moves in the downstream direction, the valve tip 62 first contacts the resilient annular portion 82. The resilient annular portion 82 begins to flex or deflect radially outwards with the movement of the valve tip 62 and forms a sealing engagement with the valve tip 62 (FIG. 3C). Once the sealing engagement is formed, no additional fluid may enter the fluid chamber 84. In this way, a generally fixed volume of fluid is located in the fluid chamber 84, which helps facilitate dispensing a precise amount of fluid from the discharge outlet 86 onto the substrate 11 for each jetting cycle (e.g., when jetting droplets of fluid in the normal operation). In particular, after the fixed volume of fluid is located in the fluid chamber 84 and further flow into the fluid chamber 84 is blocked by the sealing engagement, the volume of fluid that will be dispensed from the fluid chamber 84 through the discharge outlet 86 is generally equal to the cross-sectional area surrounded by the resilient annular portion 82 times the distance of travel of the valve tip 62 from the initial sealing engagement to the annular valve seat 80. Consequently, the volume of fluid dispensed onto the substrate 11 during each jetting cycle may be altered by changing any of the following parameters: the area surrounded by the resilient annular portion 82, the distance traveled by the valve tip 62, the amount of time the valve tip 62 is held in the open position shown in FIG. 3B, the fluid pressure in the dispensing apparatus 10, and/or the diameter of the discharge outlet 86. Regardless of the particular operational parameters chosen, the jetted droplets dispensed by the dispensing apparatus 10 define a fixed, predetermined (and generally constant) volume for each jetting cycle.

Figure 3D:
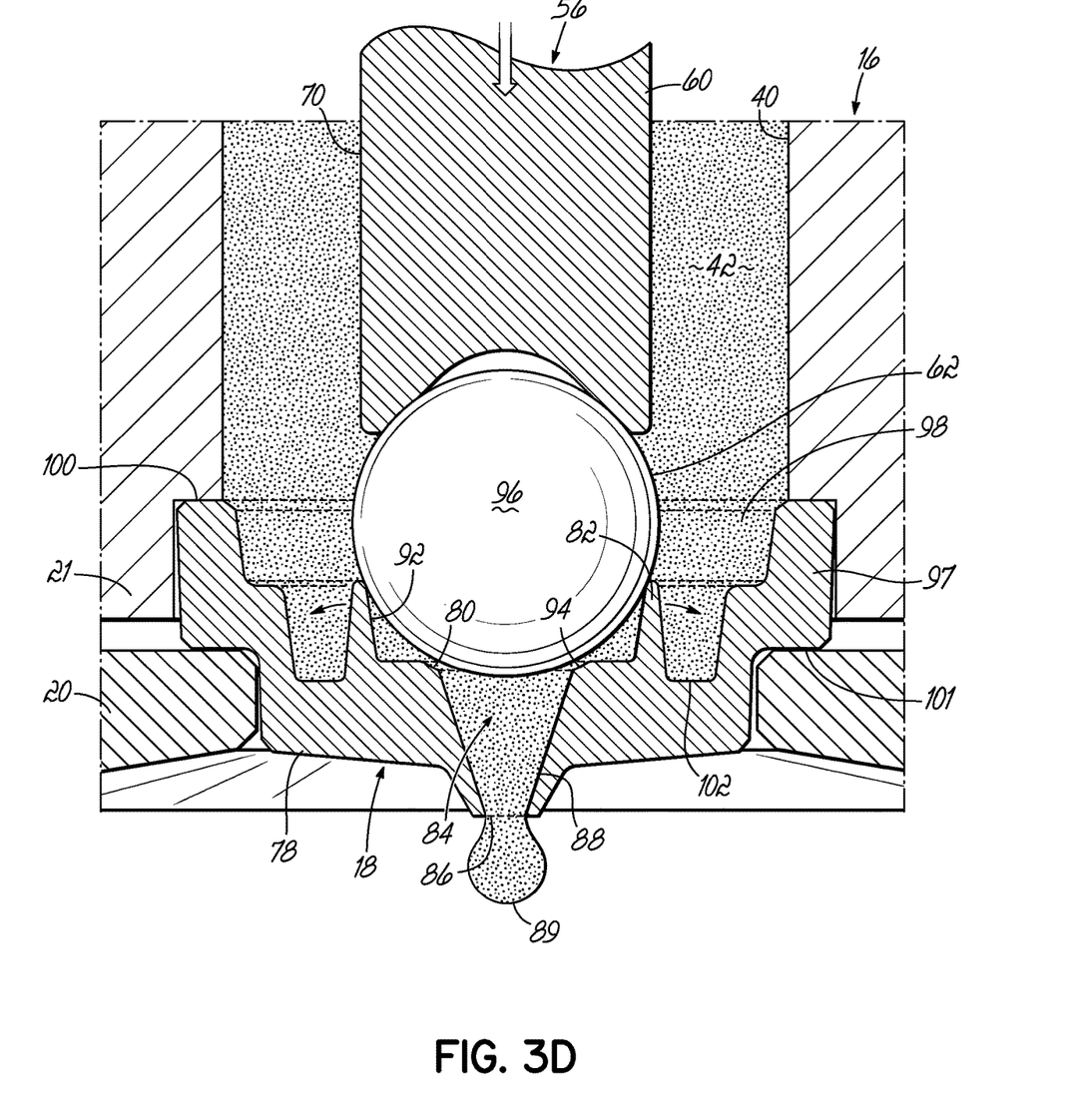
FIG. 3D is a similar view of to FIG. 3C and shows the valve stem further moving in the downstream direction, such that the resilient annular portion is deflected radially outwardly as the valve stem approaches contact with the valve seat.

After the first contact with the resilient annular portion 82, the actuator mechanism 72 continues to cause the valve stem 60 to move in the downstream direction. As the valve stem 60 continues to move in the downstream direction, the valve tip 62 displaces the fluid contained in the fluid chamber 84 and forces such fluid through the discharge outlet 86 to form the fluid deposit 89 (FIG. 3D). The resilient annular portion 82 may flex further radially outwards during this movement, as shown by the arrows in FIG. 3D, to thereby maintain the sealing engagement.

Figure 3E:
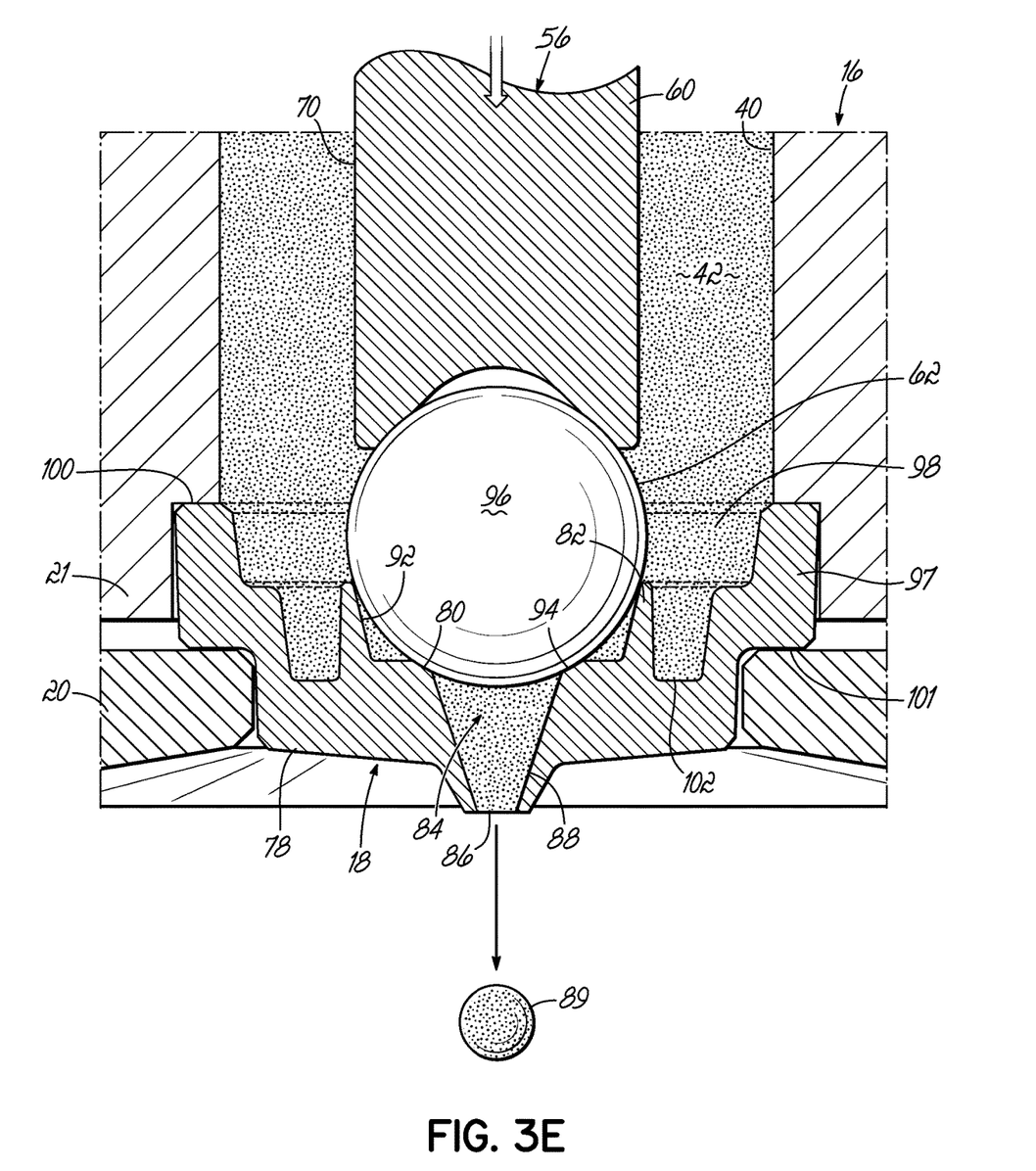
FIG. 3E is a similar view of to FIG. 3D and shows fluid dispensing from the fluid dispensing apparatus when the valve stem has moved downwardly into contact with the valve seat.
Figure 3F:
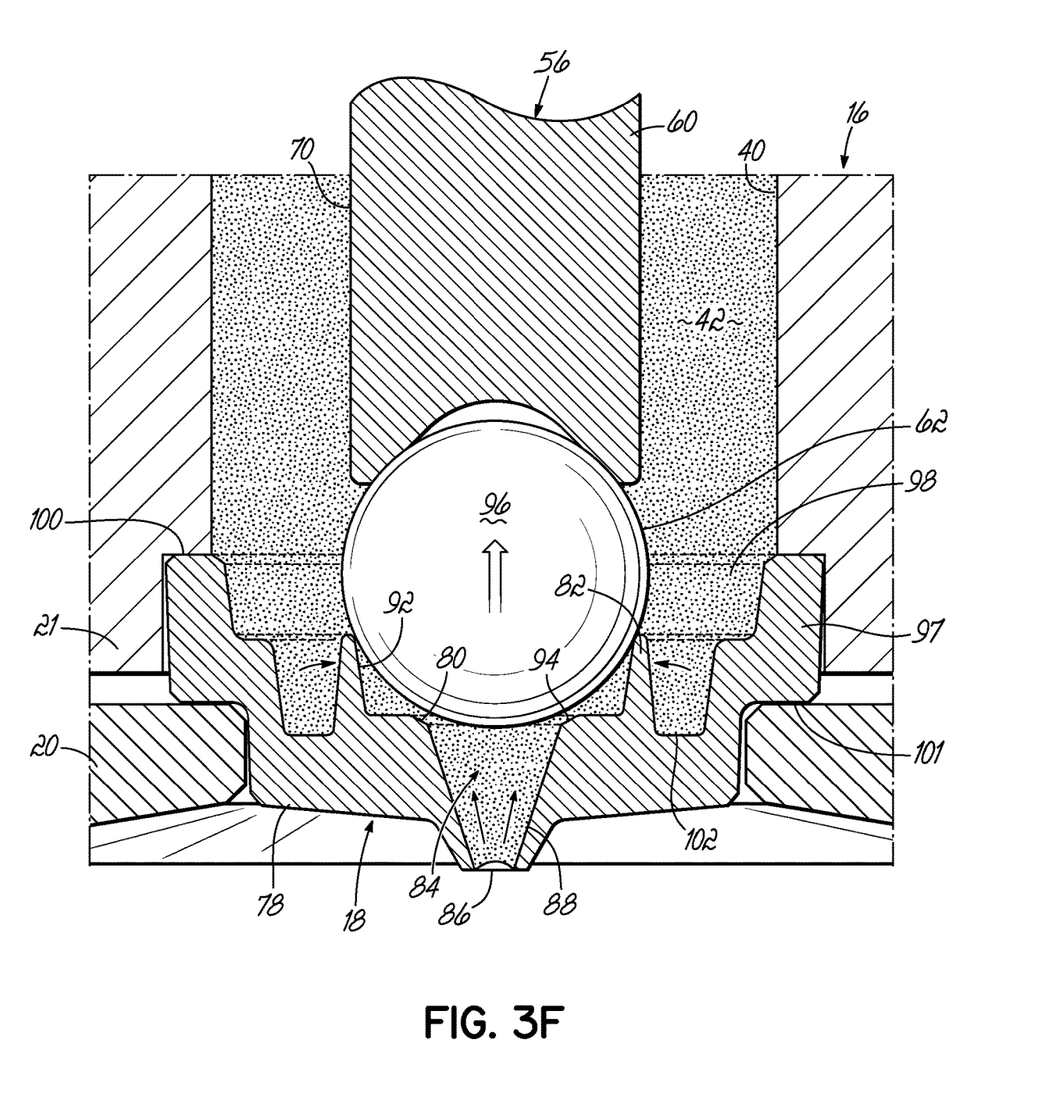
FIG. 3F is a similar view of to FIG. 3E and shows the valve stem moving in an upstream direction as a result of recoil movement of the valve stem away from contact with the valve seat after reaching state shown in FIG. 3E.

The actuator mechanism 72 continues to cause the valve stem 60 to move in the downstream direction until the valve tip 62 contacts the annular valve seat 80, which is rigid at least relative to the resilient annular portion 82 (FIG. 3E). The annular valve seat 80 is thus configured to contact and stop movement of the valve tip 62 when the valve stem 60 moves in the downstream direction. The sudden stopping of the valve stem 60 and valve tip 62 by the annular valve seat 80 causes a fluid deposit 89 to separate by jetting action from the discharge outlet 86 for dispensing onto the substrate 11.

When the valve tip 62 initially contacts the annular valve seat 80, as shown in FIG. 3E, the valve stem 60 and valve tip 62 may experience recoil or bounce back effects causing movement in the upstream direction. In addition, the resilient annular portion 82, which is deflected radially outwardly by the valve tip 62, biases the valve tip 62 in the upstream direction away from the annular valve seat 80 as described above. This recoil effect and/or biasing typically causes the valve stem 60 to temporarily overcome the force applied by the actuator mechanism 72 on the piston assembly 58 in the distal direction and, consequently, to temporarily recoil/move in the upstream direction. Such upstream movement by the valve stem 60 and the valve tip 62 creates a snuff back condition of remaining fluid in the fluid chamber 84 as shown by arrows in FIG. 3F, which further helps facilitate clean separation of the fluid deposit 89 from the discharge outlet 86 while avoiding build up of fluid on the nozzle 18. Advantageously, the sealing engagement of the valve tip 62 and the resilient annular portion 82 continues during this recoil movement, thereby avoiding flow of further pressurized fluid into fluid chamber 84 which could undermine the snuff back effect.

After the recoil movement of the valve stem 60 and the valve tip 62 in the upstream direction, the force on the piston assembly 58 in the distal direction, such as via the actuator mechanism 72 and spring 76, overcomes the flexing counter-bias of resilient annular portion 82. As a result, the valve stem 60 may move back in the downstream direction until the valve tip 62 is in a position such that it rests on the annular valve seat 80 and concurrently forms a sealing engagement with the resilient annular portion 82 (e.g., the rest condition of FIG. 3A). When the actuator mechanism 72 is turned off, the force of the spring 76 in this embodiment maintains the valve tip 62 in the rest position shown in FIG. 3A as alluded to above, and no fluid drips out of the nozzle 18 as a result of the isolation of the fluid chamber 84 from the fluid body bore 42 and the previously-described snuff back effect.

As illustrated, the valve tip 62 includes an outer spherical surface 96 in which the annular valve seat 80 and the resilient annular portion 82 are each configured to contact as the valve stem 60 moves in the downstream direction. A surface 94 (best illustrated in FIG. 2) of the annular valve seat 80 is curved in a chamber-like manner between the base surface 102 and the conical passageway 88 to correspond to and receive the outer spherical surface 96. In one embodiment, the annular valve seat 80 and the resilient annular portion 82 are each circular, the annular valve seat 80 includes a diameter that is less than the diameter of the resilient annular portion 82, and the resilient annular portion 82 includes a diameter that is less than the diameter of the outer spherical surface 96. In this way, as the valve tip 62 moves in the downstream direction, the larger diameter of the outer spherical surface 96 causes the resilient annular portion 82 to flex radially outwards, and the smaller diameter of the relatively rigid annular valve seat 80 stops movement of the valve stem 60 in the downstream direction upon contact with the valve tip 62. In this embodiment, the positioning rim 97 is also circular and defines a diameter even larger than the outer spherical surface 96, so that the valve tip 62 moves freely in the fluid body bore 42 and the central bore 98.

Figure 3G:
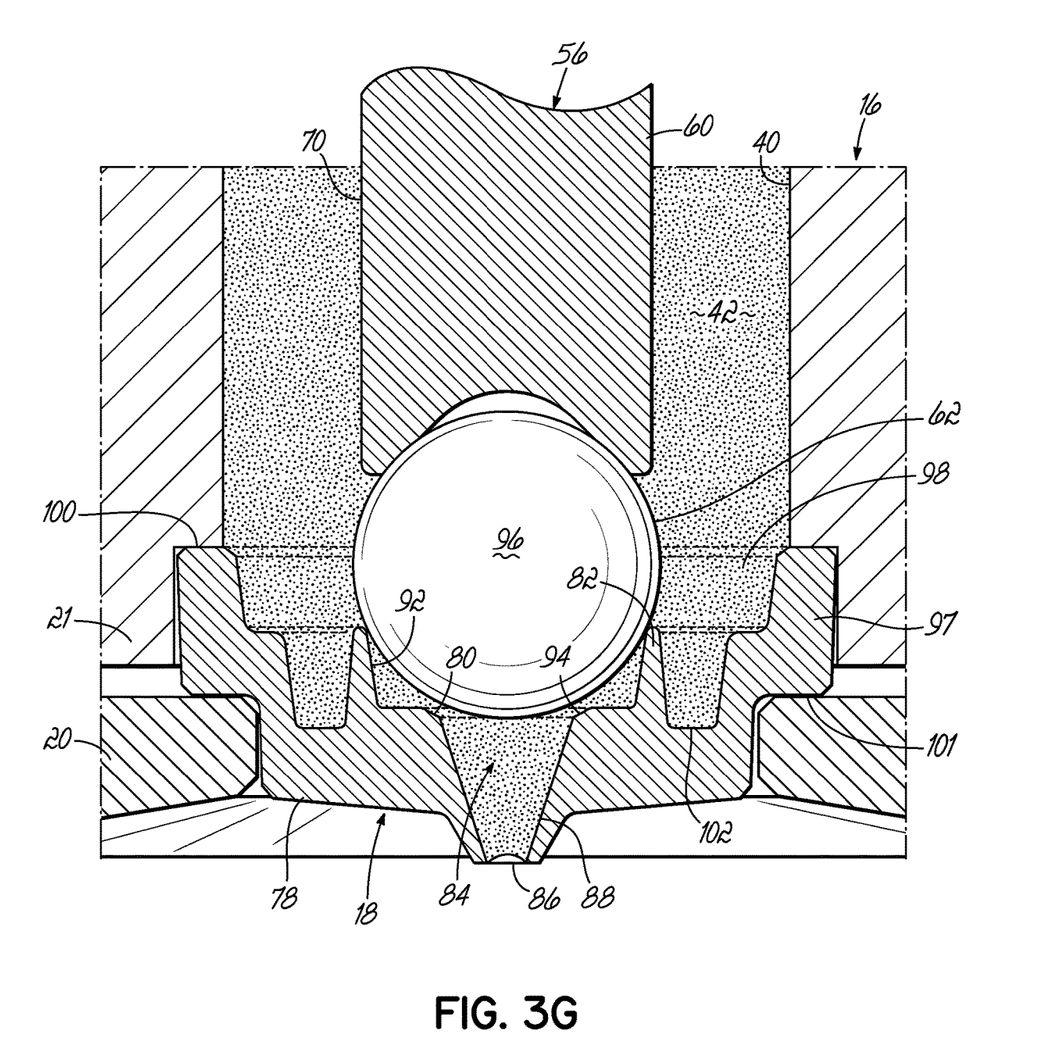
FIG. 3G is a similar view of to FIG. 3A and shows the valve stem at rest in accordance with another embodiment of the nozzle.

In an alternative embodiment of the nozzle shown in FIG. 3G, when the fluid dispensing apparatus 10 is at rest, the valve stem 60 is positioned such that the valve tip 62 rests on and forms a sealing engagement with the resilient annular portion 82, but also such that the valve tip 62 is not in contact with the annular valve seat 80. Therefore, when the fluid dispensing apparatus 10 is at rest in this embodiment, the static force applied to the piston assembly 58 and the valve stem 60 by the spring 76 at the actuator mechanism 72 in the distal direction is not so much as to overcome the counter-bias produced by the flexing resiliency of the resilient annular portion 82. As a result, the resiliency of the resilient annular portion 82 is configured to return the valve tip 62 to the rest position of FIG. 3G when the actuator mechanism 72 is not operating. Although FIG. 3G shows fluid in the nozzle 18 specifically at the fluid chamber 84, it will be understood that when the fluid dispensing apparatus 10 is at rest, little or no fluid may be present in the nozzle 18 in some operational cycles. As before, the sealing engagement formed between the valve tip 62 and resilient annular portion 82 prevents fluid in the fluid body bore 42 from moving into and collecting in the fluid chamber 84 of the nozzle 18. In this way, the sealing engagement reduces the potential for fluid in the fluid body bore 42 from drying up and clogging the nozzle 18, or inadvertently dispensing (e.g., dripping or drooling out), when the fluid dispensing apparatus 10 is at rest.

Consequently, in each embodiment of the nozzle 18 in accordance with this disclosure, the resilient annular portion 82 advantageously seals against the valve tip 62 before and after the valve tip 62 contacts the valve seat 80. This arrangement avoids the supply of pressurized fluid into the fluid chamber 84 and through the discharge outlet 86 except when the actuator mechanism 72 is operated to cause jetting or dispensing of precise fluid deposit 89. As such, the fluid is clearly broken away from nozzle 18 in each dispensing cycle, and build-up of fluid that could adversely affect future dispensing cycles is avoided. Thus, the nozzle 18 of the embodiments above improves the functionality and performance of the fluid dispensing apparatus 10, at least compared to conventional systems described in the background section above.

While the present invention has been illustrated by the description of specific embodiments thereof, and while the embodiments have been described in considerable detail, it is not intended to restrict or in any way limit the scope of the appended claims to such detail. The various features discussed herein may be used alone or in any combination. Additional advantages and modifications will readily appear to those skilled in the art. The invention in its broader aspects is therefore not limited to the specific details, representative apparatus and methods and illustrative examples shown and described. Accordingly, departures may be made from such details without departing from the scope or spirit of the general inventive concept.

What is claimed is:

1. A method for dispensing droplets of fluid with a fluid dispensing apparatus including a dispenser body, a valve stem with a valve tip, and a nozzle having a nozzle body defining a fluid chamber terminating in a discharge outlet, an annular valve seat, and a resilient annular portion, the method comprising:
   moving the valve stem relative to the dispenser body and the nozzle body;
   collecting fluid in the fluid chamber flowing from the dispenser body when the valve stem is moved in an upstream direction with the valve tip out of engagement with the annular valve seat and the resilient annular portion;
   dispensing fluid in the fluid chamber out of the discharge outlet when the valve stem is moved in a downstream direction by:
      forming a sealing engagement between the resilient annular portion and the valve tip when the valve tip comes into contact with the resilient annular portion;
      deflecting the resilient annular portion outwards with the valve tip during continued movement in the downstream direction;
      contacting the annular valve seat with the valve tip after forming the sealing engagement between the resilient annular portion and the valve tip; and
      forcing a droplet of the fluid through the discharge outlet and out of the nozzle as a result of movement of the valve tip between initial contact with the resilient annular portion and contact with the annular valve seat.

2. The method of claim 1, wherein forming the sealing engagement between the resilient annular portion and the valve tip comprises capturing a predetermined volume of the fluid in the fluid chamber, such that the droplet forced through the discharge outlet also defines a predetermined volume.

3. The method of claim 1, further comprising:
   after the valve tip contacts the annular valve seat, biasing the valve tip away from the annular valve seat using the resilient annular portion.

4. The method of claim 3, wherein moving the valve stem further comprises:
   actuating an actuator mechanism to force the valve stem and the valve tip to move in the upstream direction; and
   biasing the valve stem and the valve tip with a spring of the actuator mechanism to move in the downstream direction following actuation of the actuator mechanism.

5. The method of claim 4, wherein the bias of the spring and the bias of the resilient annular portion are balanced such that the method further comprises:
   maintaining the valve tip in the sealing engagement with the resilient annular portion and spaced apart from the annular valve seat as a result of the balanced biases when in a rest state between dispensing cycles.

6. The method of claim 4, wherein actuating the actuator mechanism to force the valve stem and the valve tip to move in the upstream direction comprises providing pressurized air to a pneumatic system to force the valve stem and the valve tip to move in the upstream direction.

7. The method of claim 6, further comprising receiving a time period from a user, wherein providing the pressurized air to the pneumatic system comprises providing the pressurized air to the pneumatic system for the time period to force the valve stem and the valve tip to move in the upstream direction.

8. The method of claim 4, wherein the actuator mechanism is a piezo-electric actuator, a solenoid actuator, a voice coil actuator, or a mechanical motor actuator.

9. The method of claim 1, wherein:
   the valve tip rests on the annular valve seat to form the sealing engagement with the resilient annular portion when the fluid dispensing apparatus is in a rest state, and
   moving the valve stem relative to the dispenser body and the nozzle body comprising moving the valve stem in the upstream direction.

10. The method of claim 1, further comprising pressurizing the fluid from a fluid supply into the dispenser body.

11. The method of claim 1, wherein the nozzle is removably coupled to the dispenser body, the method further comprising:
   removing the nozzle from the fluid dispensing apparatus following dispensing of the fluid.

12. The method of claim 1, wherein forcing the droplet of the fluid out of the nozzle comprises dispensing the droplet of the fluid onto a substrate.

13. The method of claim 1, wherein the annular valve seat and the resilient annular portion are formed as one integrated unit.

14. The method of claim 1, wherein the valve tip has an outer spherical surface.

15. The method of claim 1, wherein the fluid comprises solder flux, solder paste, solder mask, an adhesive, oil, an encapsulant, a potting compound, ink, or a silicone.

* * * * *